United States Patent
Skjolsvold et al.

(10) Patent No.: US 9,749,208 B2
(45) Date of Patent: Aug. 29, 2017

(54) INTEGRATED GLOBAL RESOURCE ALLOCATION AND LOAD BALANCING

(71) Applicant: MICROSOFT CORPORATION, Redmond, WA (US)

(72) Inventors: Arild Skjolsvold, Kenmore, WA (US); Bradley Gene Calder, Bellevue, WA (US); Ju Wang, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/319,553

(22) Filed: Jun. 30, 2014

(65) Prior Publication Data

US 2015/0381453 A1  Dec. 31, 2015

(51) Int. Cl.
- *H04L 12/26* (2006.01)
- *H04L 12/911* (2013.01)
- *G06F 9/50* (2006.01)

(52) U.S. Cl.
CPC .......... *H04L 43/0876* (2013.01); *G06F 9/505* (2013.01); *H04L 47/828* (2013.01)

(58) Field of Classification Search
CPC .... G06F 9/5011; G06F 9/5061; G06F 9/4881; G06F 2209/501; G06F 2209/485;
(Continued)

(56) References Cited

U.S. PATENT DOCUMENTS 7,362,766 B2 * 4/2008 Karlsson et al. .......... 370/395.4
8,121,883 B2 * 2/2012 Johnson et al. ............. 705/7.27
(Continued)

FOREIGN PATENT DOCUMENTS

WO  2006135466 A2  12/2006

OTHER PUBLICATIONS

Shue et al., "Performance Isolation and Fairness for Multi-Tenant Cloud Storage", Oct. 12, 2012, 10th USENIX Symposium on Operating Systems Design and Implementation.*

(Continued)

*Primary Examiner* — Vivek Srivastava
*Assistant Examiner* — Todd L Barker
(74) *Attorney, Agent, or Firm* — Shook, Hardy & Bacon L.L.P.

(57) ABSTRACT

In various embodiments, methods and systems for integrated resource allocation and loading balancing are provided. A global resource allocator receives usage information of resources in a cloud computing system. The usage information is associated with a plurality of accounts and consumer operations pairs on servers of the cloud computing system. For selected account and consumer operation pairs associated with a particular resource, allocation targets are determined and communicated to the corresponding server of the selected account and consumer operation pairs. The servers use the resource based on the allocation targets. A load balancer receives the usage information the resource and the allocation targets. The allocation targets indicate a load by the selected account and consumer operation pairs on their corresponding servers. The load balancer performs a load balancing operation to locate a server with a capacity to process the allocated target of the selected account and consumer operation pairs.

20 Claims, 5 Drawing Sheets

(58) Field of Classification Search
CPC ......... G06F 2209/4881; G06F 9/45558; G06F 9/5088; G06F 3/0631; G06F 3/067; G06F 3/0659; G06F 3/061; G06F 3/0653; G06F 9/505; G06F 17/30657; G06F 17/30864; G06F 2209/504; H04L 67/10; H04L 43/087; H04L 43/0817; H04L 43/0852; H04L 43/10; H04L 41/5096; H04L 41/5054; H04L 41/5019; H04L 67/1002; H04L 67/1012; H04L 67/1008; H04L 47/623; H04L 47/12; H04L 43/0876; H04L 47/828; H04L 12/5695; H04L 47/10; G06Q 10/06; G06Q 10/06312; Y02B 60/142

See application file for complete search history.

(56) References Cited

U.S. PATENT DOCUMENTS

| | | | | |
|---|---|---|---|---|
| 8,234,378 | B2* | 7/2012 | Stephens | H04L 67/1008 709/205 |
| 8,336,054 | B2* | 12/2012 | Cherkasova et al. | 718/104 |
| 8,425,324 | B2* | 4/2013 | Kemmerling | 463/42 |
| 8,627,326 | B2* | 1/2014 | Gebhart | 718/104 |
| 2003/0046396 | A1 | 3/2003 | Richter et al. | |
| 2004/0064557 | A1* | 4/2004 | Karnik | G06F 9/5055 709/225 |
| 2007/0240140 | A1* | 10/2007 | Degenaro | G06F 9/5066 717/158 |
| 2008/0222643 | A1* | 9/2008 | Baryshnikov | G06F 9/4881 718/104 |
| 2009/0265707 | A1* | 10/2009 | Goodman | G06F 9/5016 718/1 |
| 2011/0238838 | A1* | 9/2011 | Avalani | G06F 9/5011 709/226 |
| 2011/0252166 | A1* | 10/2011 | Padala | G06F 3/061 710/74 |
| 2011/0307895 | A1* | 12/2011 | Liao | G06F 9/5027 718/102 |
| 2012/0180061 | A1* | 7/2012 | Rao | G06F 9/5088 718/104 |
| 2012/0233668 | A1 | 9/2012 | Leafe et al. | |
| 2012/0260256 | A1* | 10/2012 | De Faria | G06F 9/5011 718/103 |
| 2012/0271949 | A1 | 10/2012 | Radhakrishnan et al. | |
| 2013/0003538 | A1* | 1/2013 | Greenberg | H04L 47/12 370/230 |
| 2013/0111489 | A1* | 5/2013 | Glew | G06F 9/4881 718/103 |
| 2013/0111989 | A1* | 5/2013 | Casadio | F01D 5/027 73/460 |
| 2013/0173803 | A1 | 7/2013 | Pijewski et al. | |
| 2013/0238383 | A1 | 9/2013 | Licari et al. | |
| 2013/0254407 | A1 | 9/2013 | Pijewski et al. | |
| 2014/0075034 | A1 | 3/2014 | Vasudevan et al. | |
| 2015/0032894 | A1* | 1/2015 | Rosensweig | H04L 41/5019 709/226 |
| 2015/0058484 | A1* | 2/2015 | Mehta et al. | 709/225 |

OTHER PUBLICATIONS

Shue et al., "Performance Isolation Fairness for Multi-Tenant Cloud Storage", 10th USENIX Symposium onOperating Systems Design and Implementation (OSDI 2012), (14 pages total).*

Shue et al., "Performance Isolation Fairness for Multi-Tenant Cloud Storage", 10th USENIX Symposium on Operating Systems Design and Implementation (OSDI 2012), (14 pages total).*

Dr. Yaroslav Vorobets, "Cartesian Products and Relations", 2013, http://www.math.tamu.edu/~yvorobet/MATH423-2012A/Lect1-13web.pdf (9 pages total).*

Dr. Gary MacGillivray, "Cartesian Products and Relations", 2013, http://www.math.uvic.ca/faculty/gmacgill/guide/RF.pdf (14 pages total).*

Lakew, et al., "Management of Distributed Resource Allocations in Multi-cluster Environments", In Proceedings of IEEE 31st International Performance Computing and Communications Conference, Dec. 1, 2012, 10 pages.

Ananthanarayanan, et al., "True Elasticity in Multi-Tenant Data-Intensive Compute Clusters", In Proceedings of the Third ACM Symposium on Cloud Computing, Oct. 14, 2012, 7 pages.

Xiong, et al., "Intelligent Management of Virtualized Resources for Database Systems in Cloud Environment", In Proceedings of IEEE 27th International Conference on Data Engineering, Apr. 11, 2011, 12 pages.

Wang, et al., "Adaptive Resource Allocation in Tiered Storage Systems", In Proceedings of 10th USENIX Conference on File and Storage Technologies, Feb. 2013, 2 pages.

"International Search Report & Written Opinion Issued in PCT Application No. PCT/US2015/038211", Mailed Date: Sep. 24, 2015, 11 Pages.

"Second Written Opinion Issued in PCT Application No. PCT/US2015/038211", Mailed Date: Jun. 29, 2016, 10 pages.

"International Preliminary Report on Patentability Issued in PCT Application No. PCT/US2015/038211", Mailed Date: Sep. 16, 2016, 11 Pages.

* cited by examiner

INTEGRATED GLOBAL RESOURCE ALLOCATION AND LOAD BALANCING

BACKGROUND

Cloud computing systems may offer building, deployment and management of different types of applications and services. Cloud computing systems further include distributed storage systems that provide scalable storage resources. In multi-tenant cloud computing systems, computing operations compete for a limited amount of computing resources. A computing operation may replicate user data using CPU cycles to perform the replication tasks. The CPU cycles and various other types of computing resources can be allocated to computing operations to optimize latency, efficiency, and load balancing within the cloud computing system. However, conventional resource allocation techniques rely on reactive throttling and local protection mechanisms to allocate resources and thus fail to provide a dynamic, globally-implemented, fairness-based, performance isolation solution to resource allocation.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Embodiments of the present invention provide methods and systems for integrated global resource allocation and load balancing in a cloud computing system. This may be accomplished using a system having a global resource allocator and a load balancer. In particular, the global resource allocator may be configured to receive usage information of resources in the cloud computing system. The usage information is associated with a plurality of accounts and consumer operations pairs on a plurality of servers of the cloud computing system. For each of the account and consumer operation pairs associated with a particular resource, an allocation target is determined and communicated to the corresponding server of the account and consumer operation pair. The load balancer is further configured to receive the usage information of resources and allocation targets of the plurality of account and consumer operation pairs. The allocation target can indicate a load of the corresponding server of each of the plurality of account and consumer operation pairs. Based on usage information and the allocation targets of the plurality of account and consumer operation pairs, a load balancing operation is performed to locate a server with a capacity to process the allocated target of the at least of the account and consumer operation pairs.

BRIEF DESCRIPTION OF THE DRAWINGS

The present invention is described in detail below with reference to the attached drawing figures, wherein.

DETAILED DESCRIPTION

Figure 1:
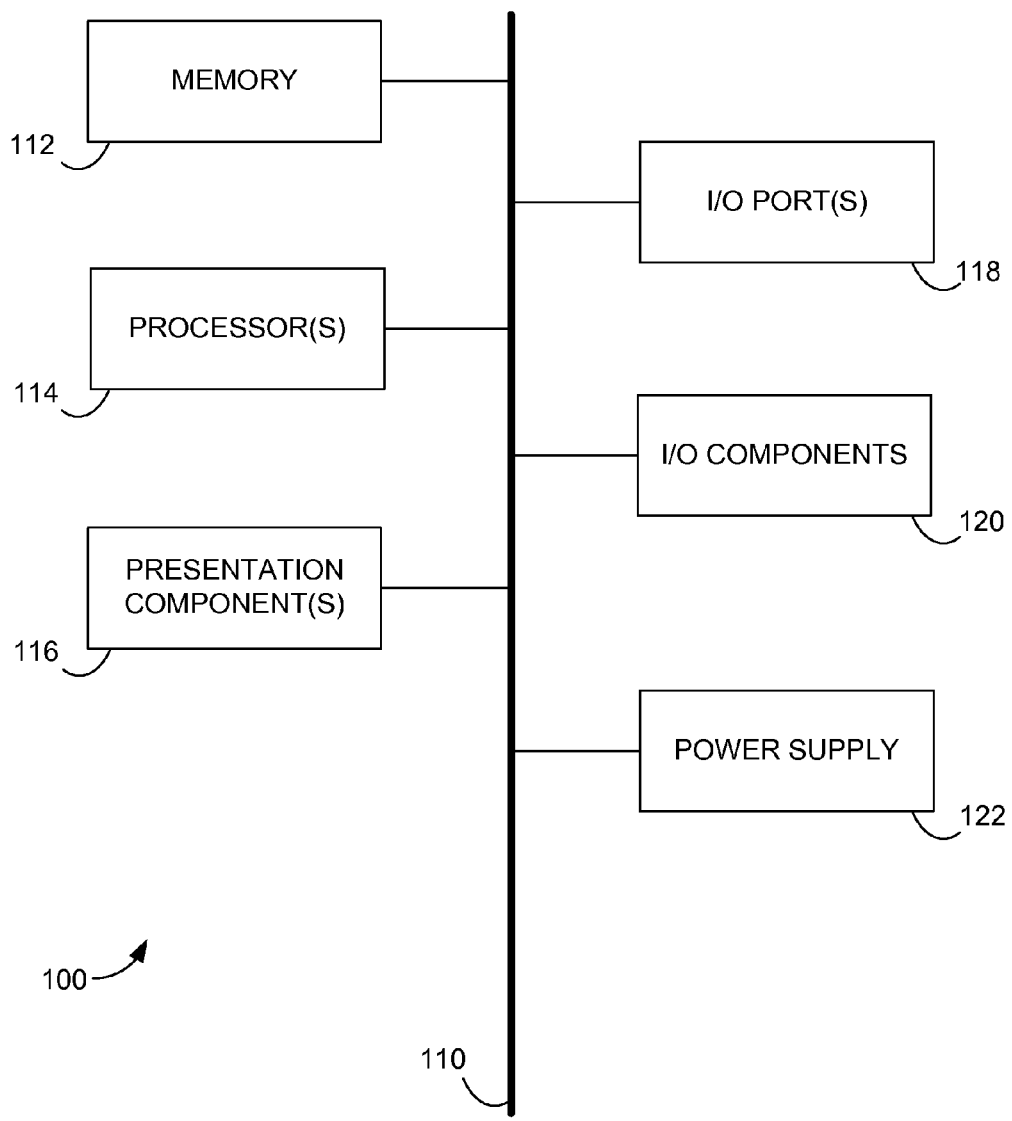
FIG. 1 is a block diagram of an exemplary computing environment suitable for use in implementing embodiments of the present invention.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising." In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion below, embodiments of the present invention are described with resources (e.g., CPU, memory, bandwidth, and API calls), consumer operations (e.g., live requests, replication, account migration, and garbage collection) and a cloud computing system having a partition master in partition layer architecture that manages the partitioning of all data objects in the cloud computing system; however, the resources, consumer operations, and partition master are merely exemplary and it is contemplated that the techniques described may be extended to other implementation contexts.

Typically, a cloud computing system acts to store data or run service applications in a distributed manner. A cloud computing system may span wide geographic locations, including countries and continents. The service-application components (e.g., tenant infrastructure or tenancy) of the cloud computing system may include nodes (e.g., computing devices, processing units, or blades in a server rack) that are allocated to run one or more portions of a tenant's service applications. When more than one separate service applications are being supported by the nodes, the nodes may be partitioned into virtual machines or physical machines that concurrently run the separate service applications, respectively, in individualized computing environments that support the resources and/or operating system specific to each service application. Further, each service application may be divided into functional portions such that each functional portion is able to run on a separate virtual machine.

In cloud computing systems, multiple servers may be used to run service applications and perform data storage operations in a cluster. In particular, the servers may perform data operations independently but exposed as a single device referred to as a cluster. Each server in the cluster may be referred to as a node. In scalable data storage systems, when the capacity to storage data becomes low, a new server may be added as a new storage node. Multiple nodes compete for the same physical resources. A resource may generally refer to physical or abstract component available within a computing system that facilitate performing computing operations. By way of example, resources can include CPU cycles, network bandwidth, random access memory, API calls and so on.

Cloud computing systems may further implement different types of tenants with different types of accounts, needing different types of resources and computing operations. In particular, computing operations could include receiving live requests for data or background-implemented account migration operations. Physical and abstract resources may be limited causing bottle necks in performing the different types of computing operations that compete for the same physical and abstract resources. Conventional resource allocation techniques rely on reactive throttling and local protection mechanisms to allocate resources. For example, network bandwidth throttling may refer to a reactive measure employed in an attempt to regulate bandwidth congestion. Bandwidth throttling works by limiting the rate at which a bandwidth intensive device (e.g., a server) accepts data. Without throttling, the device can overload its processing capacity. Further, local protection mechanisms run independently of other nodes and servers, optimizing resources allocation based only on local goals without regard for global optimization of resources especially in situations where conflicts may arise. In this regard, resource allocation solutions today fail to provide a dynamic, globally-implemented, fairness-based, performance isolation solution to resource allocation. With embodiments of the present invention, resource allocation techniques may be implemented to further provide load balancing that coordinate the different computing operations to optimize resource across servers.

Generally, embodiments of the present invention provide simple and efficient methods and systems for integrated global resource allocation and load balancing in cloud computing systems. In particular, clusters in the cloud computing system support cluster level resource allocation and problem isolation for shared resources in the cloud computing system. It is contemplated that embodiments of the present invention may further facilitate coordinating load balancing out the resource usage and allocation across nodes in order to maximize the resource usage efficiency across the entire cluster. In embodiments, a cluster may include several computing operations competing for the same resources. Live request operations may consume CPU cycles, and other operations, including, geo-replication, account migration and garbage collection operations may further consume CPU cycles. Dynamically allocating resources in accordance with embodiments of the present invention can be based on the specific demands of each computing operation such that all computing operations make progress. An algorithm may be defined to compute the resource allocation which ensures fairness across accounts and computing operations. In embodiments, accounts and/or computing operations may have different priorities based on weights associated therewith, such that, when a resource shortage is determined, the accounts and/or computing operations that correspond to higher weights can have priority in getting resources over other accounts and/or computing operations.

In embodiments of the present invention, resource allocation may specifically be described with reference to resources, consumer operations, accounts, demand, and backlog/lag as defined herein and further customized herein for different contexts to handle different scenarios. A resource may be a physical resource or an abstract resource that facilitates computing operations in the cloud computing system. By way of example, a physical resource may refer to CPU cycles, bandwidth, or memory and an abstract resource may refer to certain API calls to components of the cloud computing system. A resource may be associated with a resource quota that defines a global capacity limit on a cluster and a local capacity limit on a node. For example, API calls to a data stream layer of the cloud computing system can be defined as a resource and a global capacity limit and local capacity limit can be defined to a corresponding cluster and nodes in the storage cluster. Other variations of physical resources and abstract resources are contemplated with embodiments of the present invention.

Embodiments of the present invention may further define consumer operations. Consumer operations may generally refer to computing operations that utilize a resource of the cloud computing system. Multiple consumer operations may compete for the same resources across nodes in a cluster. Each consumer operation may be defined with a weight attribute. The weight attribute is a weight value that indicates a fair share of the amount the consumer operation is entitled to obtain. By way of example, consumers operations can include a live request, geo-replication, account migration, garbage collection and so on. It is contemplated that the weight value of consumer operations may be different for a particular consumer operation. For example, live request and geo-replication consumer operations may have higher weights than account migration and garbage collection consumer operations.

The consumer operation may further be associated with a plurality of additional attributes that facilitate the allocation of resources. For example, a demand attribute refers to an amount of a resource needed to progress in the performing the consumer operation. A usage attribute that indicates the actual amount of a resource consumed. A backlog or lag attribute may define a metric that measures an amount of a resource needed by a given consumer operation to achieve a desired progress to clear an associated backlog. A tolerance attribute may define a metric that measures how tolerant the consumer operation is of delays in performing the consumer operation. One or more of the attributes can be used to determine the demand of a corresponding consumer operation. For example, the backlog attribute in combination with the usage attribute can be used to estimate the demand for a consumer operation. Each of the tolerance attribute, backlog attribute and usage attribute may be quantified using a designated metric and used in a demand function to determine a demand for a plurality of consumer operations Any other combinations and variations of attributes to determine a demand are contemplated with embodiments of the present invention.

An account as used in embodiments of the present invention refers to a customer account. Accounts may correspond to consumer operations where consumer operations use resources on behalf of individual accounts. The amount of a resource consumed by a consumer operation on behalf of each account can be tracked independently. Accounts can also include a weight attribute, where the weight attribute indicates the amount of fair share a given account is entitled to obtain. Accounts may be implemented in a priority framework with each different priority levels associated with weight attributes. By way of example, a default account, a premium account, a provisioned account, and a service account, may be associated with corresponding weight attributes. The default account weight attribute may have a first weight for a capacity and/or transaction rate quota, while the premium account, provisioned account, and service account have different weights for the capacity and/or transaction rate quota. The service account, in particular, may be a critical account associated with high business impact services and may be assigned a weight such that the service account may have priority in getting resources prior to other accounts.

Embodiments of the present invention may be implemented based on exemplary components in the cloud computing system. Components may include a master supporting a plurality of server components. The master having a global resource allocator module and load balancer module. The global resource allocator allocates resources in a fair manner across different accounts and consumer operations at the cluster level. In embodiments, fairness may be based on weights associated with accounts and/or consumer operations. Further, a plurality of resource monitor modules may be implemented on each node in the cluster to collect resource utilization statistics and a plurality of throttling control modules may be implemented on each node in the cluster to control and manage resource usage based on allocated quotas across accounts and computing operations.

In embodiments of the present invention, a demand-based resource allocation algorithm may comprise computing a demand for an account and consumer operation pair. The account and consumer operation pair may be one of a plurality of account and consumer operation pairs. In particular, each account and consumer operation pair may be associated with a selected resource for which a demand is determined. A total demand is determined based on the demand for each of the plurality of account and consumer operations pairs associated with the selected resource. The total demand may be based on a particular computing component including a server, a plurality of servers, or clusters. Other variations of calculating total demand are contemplated with embodiments of the present invention.

A determination can be made whether the total demand for the selected resource is less than or more than the total an available amount for the resource When it is determined that the total demand is less than the available amount, the allocation target is set to the demand attribute value and returned. Basically each account and consumer operation pair receives an allocation target that is at least equal to the demand calculated. The allocation target is communicated to a corresponding server for each of the plurality of account and consumer operation pairs.

When it is determined that the total demand is more than the available amount, a fair allocation of resources, across account and consumer operation pairs, is determined. In embodiments, accounts and consumer operations can be associated with weight values that implicate their fair allocation of limited resources. By way of example, a weight attribute for each of the plurality of accounts can be normalized. A weight attribute for the each of the plurality of consumer operations can also be normalized. A weight for a consumer operation in an account and consumer operation pair is computed as a Cartesian product of a normalized weight of the account and a normalized weight of the consumer operation. A max-min fairness algorithm can be performed on the computed Cartesian product to generate allocation target values for the plurality of account and consumer operation pairs.

Embodiments of the present invention further integrate resource allocation with loading balancing based on the allocation targets associated plurality of account and consumer operation pairs. In particular, a load balancer module uses the allocation targets and the usage information gathered from the servers to perform load balancing so that accounts can be moved to servers with sufficient resources available to meet their allocation targets. In this regard, resource allocation techniques are integrated with load balancing to optimize resources across servers.

Accordingly, in a first aspect of the present invention, a system for performing a method for integrated resource allocation and load balancing is provided. The system includes a global resource allocator. The global resource allocator is configured for receiving usage information of resources by a plurality of account and consumer operation pairs on a plurality of servers. The global resource allocator is further configured such that for at least a selected account and consumer operation pair associated with a selected resource, the global resource allocator determines an allocation target for the selected account and consumer operation pair; and communicates the allocation target for the selected account and consumer operation pair to a corresponding server of the selected account and consumer operation pair.

The system further includes a load balancer. The load balancer is configured for receiving the usage information of resources and allocation targets for the plurality of account and consumer operation pairs. The allocation targets indicate an amount of the selected resource of the selected account and consumer operation pair on the corresponding server. The load balancer is further configured such that for at least the selected account and consumer operation pair having the allocated target associated with the selected resource, the load balancer performs a load balancing operation such that the selected account and consumer operation pair is associated with a server with a capacity for an allocated target of the selected account and consumer operation pair.

In a second aspect of the present invention, a computer-implemented method for resource allocation in a cloud computing system is provided. The method includes selecting a resource. The method further includes determining a total demand by a plurality of account and consumer operation pairs for the selected resource. Each of the plurality of account and consumer operation pairs is associated with a corresponding demand. The use of "each" herein in not meant to be limiting but further contemplates a subset of the plurality of account and consumer operations pairs. The method also includes determining that the total demand is greater than an available amount on a cluster. In embodiments, the total demand may be determined for a single server having a local capacity limit. It is contemplated that a cluster can include a single server where the local capacity limit corresponds to the global capacity limit. The total demand is based on the corresponding demand of each of the plurality of account and consumer operation pairs on the cluster. The method further includes computing allocation targets for each of the plurality of account and consumer operation pairs based in part on the corresponding demand of each of the plurality of account and consumer operation pairs.

In a third aspect of the present invention, a computer-implemented method for integrated resource allocation and load balancing in a cloud computing system is provided. The method includes receiving usage information and allocation targets by a plurality of account and consumer operation pairs for a selected resource. The allocation targets indicate a load by each of the plurality of account and consumer operation pairs on a corresponding cluster. The method further includes determining that the usage information exceeds a threshold usage on corresponding server based on comparing usage information the global capacity limit. The method also includes performing a load balancing operation such that at least a selected account and consumer operation pair in the plurality of account and consumer operation pairs is associated with a server with a capacity for an allocated target for a selected account and consumer operation pair.

Having briefly described an overview of embodiments of the present invention, an exemplary operating environment in which embodiments of the present invention may be implemented is described below in order to provide a general context for various aspects of the present invention. Referring initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 1, computing device 100 includes a bus 110 that directly or indirectly couples the following devices: memory 112, one or more processors 114, one or more presentation components 116, input/output ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 112 includes computer storage media in the form of volatile and/or nonvolatile memory. The memory may be removable, non-removable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

Figure 2:
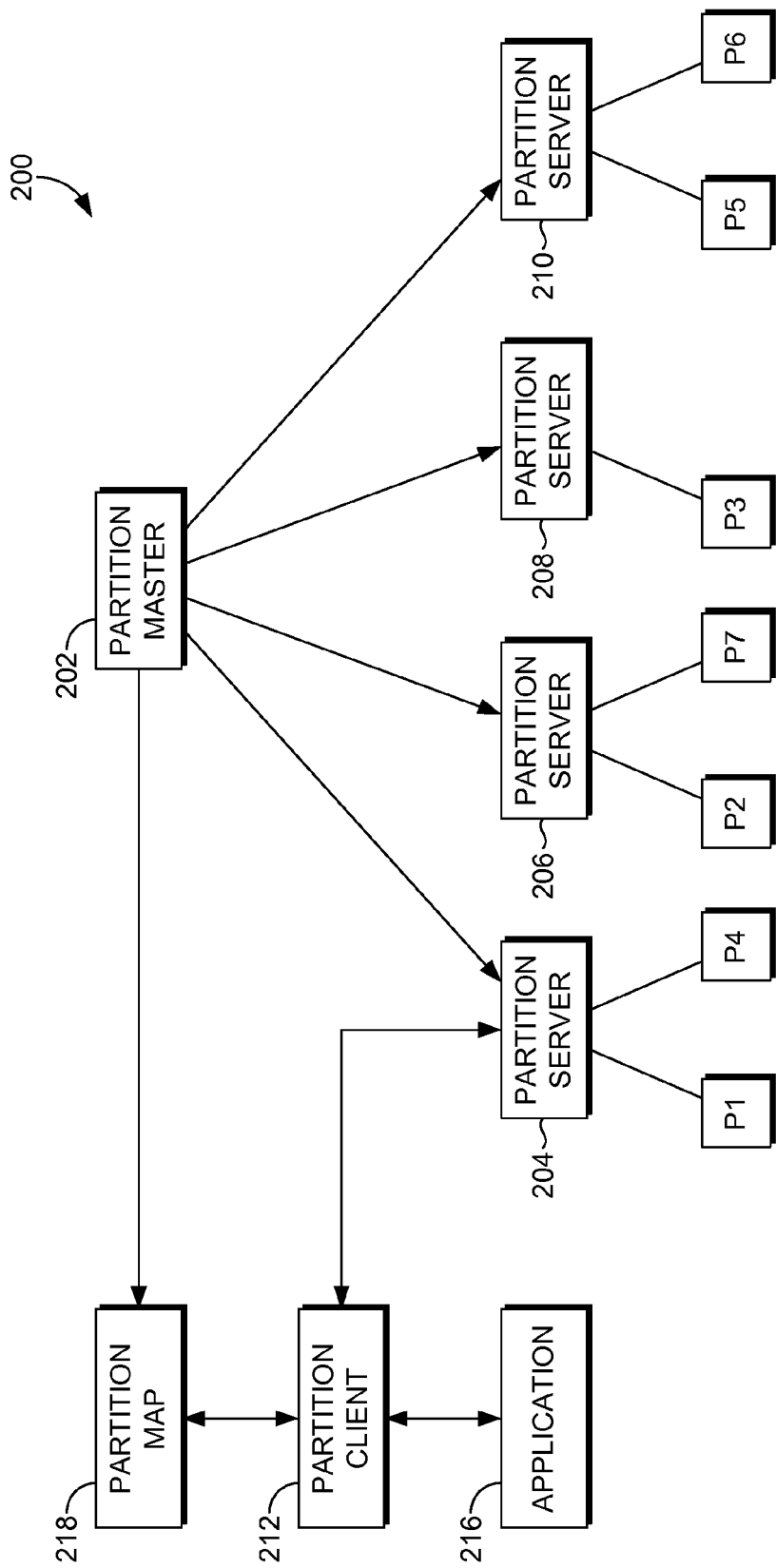
FIG. 2 is a block diagram of an exemplary distributed storage system in which embodiments of the invention may be employed.

Referring now to FIG. 2, FIG. 2 illustrates an exemplary system in which implementations of the present disclosure may be employed. In particular, FIG. 2 shows a high level architecture of cloud computing system 200 in accordance with implementations of the present disclosure. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Among other components not shown, cloud computing system 200 includes master 202 (e.g. partition master 202), servers 204, 206, 208, and 210 (e.g. partition servers 204, 206, 208, and 210), and client 212 (e.g. partition client 212). Each may reside on any type of computing device, which may correspond to computing device 100 described with reference to FIG. 1, for example. The components of cloud computing system 200 may communicate with each other over a network, which may include, without limitation, one or more local area networks (LANs) and/or wide area networks (WANs). Although a single master, four servers, and a single client are shown in FIG. 2, any number of masters, servers, and clients may be employed within cloud computing system 200 within the scope of implementations of the present disclosure.

Stored data of scalable storage 200 is divided amongst a plurality of partitions. For example, scalable storage 200 can comprise a key space divided amongst the plurality of partitions. Master 202 is configured to assign the partitions to servers 204, 206, 208, and 210, and/or other servers of cloud computing system 200 not shown. Master 202 can also be configured to determine when a partition of the partitions is not hosted by any server due to a failure and reassign the partition to a different server. Master 202 is further configured to control load balancing of the partitions on servers 204, 206, 208, 210, and/or other servers of cloud computing system 200 not shown. Additionally, Master 202 is configured to monitor resource utilization with respect to any of the partitions and/or servers 204, 206, 208, and 210, and/or other servers of cloud computing system 200 not shown. It is further contemplated that master 202 is configured to support integrated resource allocation and load balancing in accordance with embodiments of the present invention, as discussed in more detail below.

In cloud computing system 200, the servers, such as servers 204, 206, 208, and 210 are utilized to store and provide access to a storage system, for example, a storage system. Master 202 is configured to manage the servers. Furthermore, client 212 is configured to provide applications, such as application 216, access to the storage system. Each server of cloud computing system 200, such as servers 204, 206, 208, and 210, can be responsible for providing read and write access to zero to many partitions assigned to the server. Furthermore, each of the partitions can be assigned to a single one of the servers. In the example shown in FIG. 2, server 204 is hosting partitions P1 and P4, server 206 is hosting partitions P2 and P7, server 208 is hosting partition P3, and server 210 is hosting partitions P5 and P6.

Client 212 is linked into an application, such as application 216. In some implementations client 212 is configured to issue commands to some of the partitions (e.g. partitions P1, P2, P3, P4, P5, P6, and P7) hosted by servers 204, 206, 208, and 210 and/or other servers of cloud computing system 200. Also in some implementations, client 212 may communicate with the application indirectly, for example, through a virtual IP and software load balancer or other means that directs communication requests to a front-end. The front-end can utilize a partition map, such as partition map 218, to determine which of the servers is hosting (mapped to) which of the partitions and can send commands to those servers. Results of the commands can be received back from the servers and can be passed to the application. The partition map stores mappings between the partitions and the servers they are assigned to, and can typically be maintained by a master, such as master 202.

Having described various aspects of cloud computing system 200, it is noted that any number of components may be employed to achieve the desired functionality within the scope of the present disclosure. Although the various components of FIG. 2 are shown with lines for the sake of clarity, in reality, delineating various components is not so clear, and metaphorically, the lines may more accurately be grey or fuzzy. Further, although some components of FIG. 2 are depicted as single components, the depictions are exemplary in nature and in number and are not to be construed as limiting for all implementations of the present disclosure.

Figure 3:
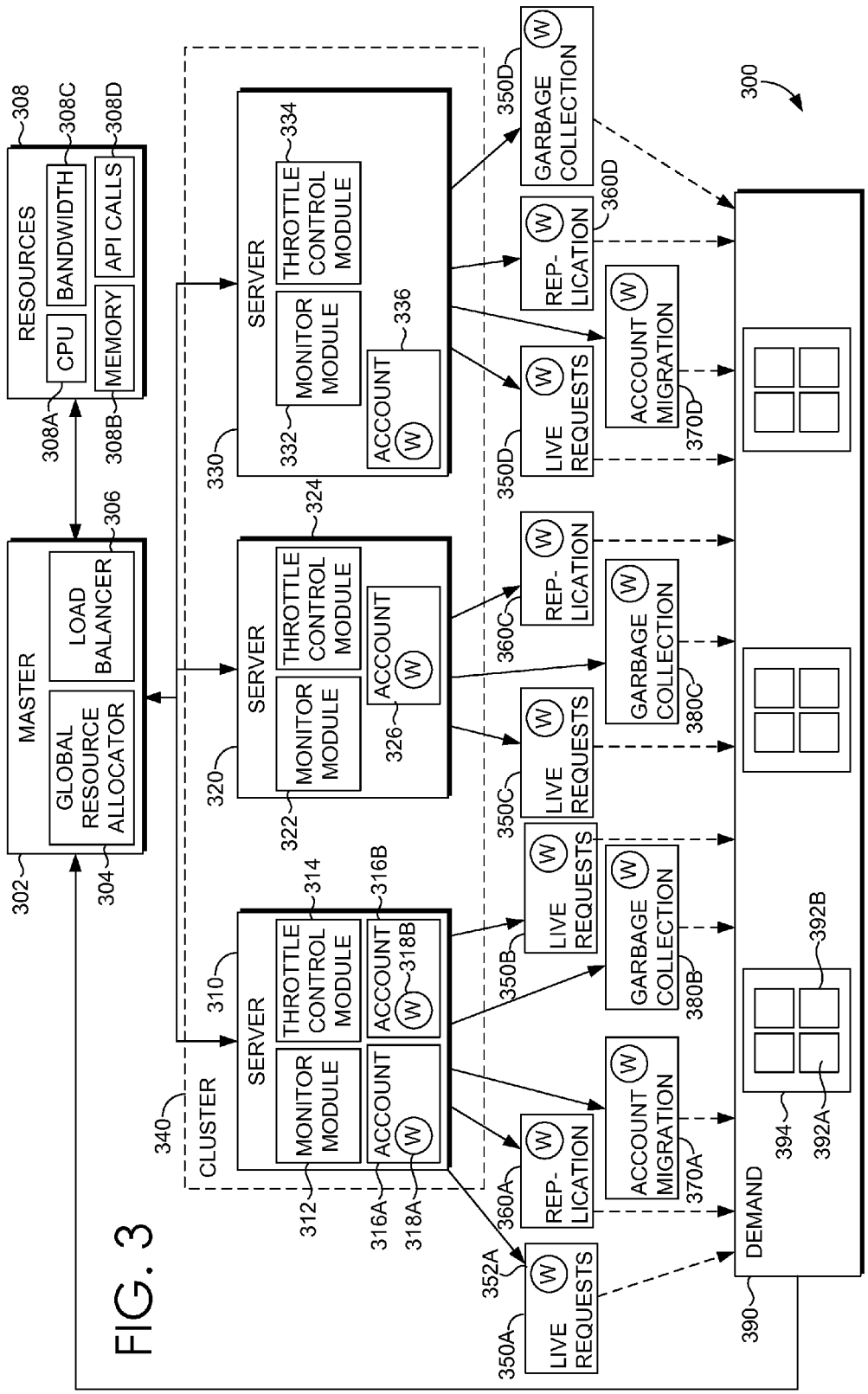
FIG. 3 is a block diagram of an exemplary operating environment in which embodiments of the invention may be employed.

Referring now to FIG. 3, FIG. 3 illustrates a block diagram depicting an exemplary integrated global resource allocation and load balancing cloud computing system operating environment 300 (hereinafter "operating environment" 300) suitable for use in embodiments of the invention is described. Generally, the operating environment 300 illustrates an environment for integrated resource allocation and load balancing in cloud computing systems based on a dynamic, globally-implemented, fairness-based, performance isolation solution. Among other components not shown, the operating environment 300 generally includes a master 302 having a global resource allocator 304 and a load balancer 306. The cloud computing system operating environment 200 further includes servers 310, 320, and 330, each having monitor modules 312, 322, 332, and throttle control modules 314, 324, 334 respectively.

It is contemplated that the plurality of servers 310, 320, and 340 may be hosted in a single cluster 340. In embodiments, the plurality of servers 310, 320 and 340 are each associated with local capacity limits (not shown) and the cluster is associated with a global capacity limit (not shown). The capacity limits may be associated with resources 340 of the operating environment 300. The global capacity limit of a cluster for a selected resource may correspond to the sum of local capacity limits of the selected resource for each of the plurality of servers in the cluster. In this regard, the usage information of resources, allocation targets of consumer operations for a resource, and the capacity limits for a servers and clusters may be used to perform throttling and/or load balancing in accordance with embodiments of the present invention.

Additionally, servers of the cluster 340 further comprise account and consumer operations pairs that utilize resources 340 of the operating environment 300. By way of example, operating environment 300 comprises server 310 having accounts 316A and 316B, server 320 having account 326, and server 330 having account 336. Each account may further be paired with consumer operations (e.g., live requests, replication, account migration, and garbage collection) that utilize resources 308. For example, account 316A is associated with consumer operations 350A, 360A, and 370A; account 316B is associated with consumer operations 350B and 380B, account 326 is associated with consumer operations 350C, 360C, and 380C, and account 336 is associated with consumer operations 350D, 360D, 370D, and 380D. As discussed above, accounts and/or computing operations may have different priorities based on weights associated therewith, such that, when a resource shortage is determined, the accounts and/or computing operations that correspond to higher weights can have priority in getting resources over other account and/or computing operation needs. For example, the account 316A is associated with a weight 318A and consumer operation 350A is associated with a weight 352A. It is contemplated that weights may be denoted in different types of designations that provide ranking between the accounts and consumer operations. Numerical designations (e.g., 1, 2, 3) and/or classification designations (high, medium, low) may be associated with the accounts and consumer operations. Other types of designations for indicating weight values are contemplated with embodiments of the present invention.

The operating environment 300 may also include a demand component 390. The global resource allocator may 304 implement the demand component 390 internally or externally of the global resource allocator 304 to gather demand for different resources 340 to facilitate resource allocation. Demand can be defined as a function of one or more of the attributes including allocation targets, usage levels, lag, and tolerance to delays, as discussed in more detail below. For example, the demand may be a default allocation target allocated to account and consumer operation pairs on a server. Demand may be for a selected resource, such as, an account and consumer operation pair demand for the selected resource. For example, consumer operations for live requests may be associated with a CPU cycle resource. As such, demand 392A can be associated with consumer operation 350A and demand 392B may be associated with consumer operation 350B. A total demand 394 for a resource on server may further be computed. For example, total demand 394 can be computed based at least on demand 392A and demand 392B. In this regard, the amount of a resource consumed by a consumer operation on behalf of each account can be tracked independently. Further, total demand may be calculated for different resources, servers, and clusters, in the operating environment 300.

In some embodiments, one or more of the illustrated components/modules may be implemented as stand-alone applications. Any number of masters, servers, and clusters may be employed in the cloud computing system operating environment 200 within the scope of embodiments of the present invention. Each may comprise a single device/interface or multiple devices/interfaces cooperating in a distributed environment. For instance, the master 302 may comprise multiple devices and/or modules arranged in a distributed environment that collectively provide the functionality of the integrated resource allocation and load balancing described herein.

It should be understood that this and other arrangements described herein are set forth only as examples. Other arrangements and elements (e.g., machines, interfaces, functions, orders, and groupings of functions) can be used in addition to or instead of those shown, and some elements may be omitted all together. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

With continued reference to FIG. 3, master 302 is associated the plurality of servers (e.g., servers 310, 320, 330). The master 302 is configured to facilitate resource allocation and load balancing across servers in an integrated manner. The master 302 is responsible for allocating resources 308 (e.g., resource 308A, 308B, 308C and 308D) across different accounts and consumer operation pairs, and providing load balancing across the plurality of servers based at least in part on the resource allocations. Load balancing refers to distributing workloads across computing multiple computing resources. Load balancing aims to optimize resource use, maximize throughput, minimize response time, and avoid overload of any one computing component. In this regard, account and consumer operation pairs may correspond to resource allocations such that the consumer operations can be performed on the plurality of servers, and in addition based on the resource allocations, accounts (i.e., partitions associated with the account) and consumer operations pairs may be load balanced across severs.

It is further contemplated that particular partitions associated with accounts may be load balanced across servers. As used herein, the term "partition" is not meant to be limiting, but generally pertains to a subset of data, or key range, of a customer's storage account. This partitioned data may be hosted on distributed nodes, partition servers, or other storage capacity allocated to a given cluster. Therefore, a particular and discrete amount of data hosted within a partition server of a cluster may be identified, at least in part, based on a partition identifier of the partition hosted on an associated partition server. In an exemplary embodiment, partitions may be utilized to manage one or more storage accounts utilizing a cluster. It is contemplated that a customer of a single storage account may utilize two or more partitions on various partition servers within a single cluster.

In embodiments of the present invention, the master 302 can implement a global resource allocator 304 and a load balancer 306 to facilitate integrated global resource allocation and load balancing. The global resource allocator 304 is configured to collect the resource usage statistics from all servers. The global resource allocator 304 may be implemented using the master 302. The resource usage statistics collected at the global resource allocator and the current allocation targets and weights of the accounts and consumer operations can be used to compute an allocation solution. Specifically, the global resource allocator 304 may determine an allocation target for a plurality of account and consumer operation pairs. The global resource allocator may communicate the allocation solution comprising the allocation target for each account and/or each consumer operation to each server. The global resource allocator 304 may further use a weight attribute of the account and/or the consumer operation to determine allocation targets, as described below in more detail.

With continued reference to FIG. 3, a monitor module (e.g., monitor module 312, 322, 332) may be associated with a server. In particular, the monitor module can be located in a corresponding server. The monitor module is configured to monitor resource utilization for each consumer operation on the server. For example, the monitor module may monitor the number of API calls made to the stream layer by a geo-replication operation, where the APIs calls are an abstract resource and the geo-replication operation is a consumer operation. The monitor module also tracks the usage information for each consumer operation and each account independently. The monitor module further may track the resource utilization status for an entire server. It is contemplated the monitor module can periodically report the data to a global resource allocator in the master 302. At a high level, the monitor module is configured to track the resource consumption information for a plurality of account and consumer operations pairs supported by the storage infrastructure. Further, the monitor module can coordinate with the throttle control module to track throttling for a consumer operation.

The throttle control module (e.g., throttle module 314, 324, 334) is configured to throttle resource utilization for a consumer operation. In particular, the throttle control module may throttle the resource utilization for each consumer operation in association with an account. In this regard, for a selected account, the resource utilization level does not exceed the corresponding allocation target. The throttle module may be implemented on a server. The server may have a local capacity limit for a particular resource. It is contemplated that the sum of local capacity of a plurality of servers in a cluster server corresponds to a global capacity limit of the entire cluster. When the local capacity limit is reached, the throttle control module can be responsible for throttling the consumer operations proportionally. In this regard, the throttle module may include usage thresholds such as meeting the local capacity limit or within a predefined percentage capacity of the local capacity limit that are used to trigger throttling. Other variations and combinations of usage thresholds are contemplated with embodiments of the present invention.

The global resource allocator 304 may implement a fairness-based resource allocation algorithm. The resource algorithm considers fairness across different accounts. An account may have multiple partitions while some small accounts may coexist in the same partition. The resource algorithm can in particular utilize a demand for a resource in the resource allocation algorithm. Demand can be defined as a function of one or more of the attributes including allocation targets, usage levels, lag, and tolerance to delays. For example, the current usage levels and current allocation targets can be used to determine the demand for a particular resource. Any variations and combinations of function for deriving demand based on the above identified variables are contemplated with embodiments of the present invention.

Further, the variables of the demand function may be defined based on the particular nature of the resource and the consumer operation associated with the resource. For example, a demand function for a live request consumer operation in association with a CPU resource may be different from a replication consumer operation in association with a CPU resource. In particular, a demand function may be defined in load balancing rules and customized and tuned as needed to meet load balancing goals.

The resource allocation algorithm in embodiments of the present invention is demand-based and also fairness-based. In particular, the resource allocation algorithm is based at least in part on a max-min fairness algorithm. At a basic level, a max-min fairness algorithm allocates an account and consumer operation pair with a small demand, what the account and consumer operation pair demands, and evenly distributes unused resources to the account and consumer operation pairs with larger demands.

In one embodiment, the max-min fair share allocation may be defined as follows: resources are allocated in order of increasing demand. Additionally, no account and consumer operation pair gets a resource share larger than its demand and account and consumer operation pairs with unsatisfied demands get an equal share of the resource. This formal definition corresponds to the following operational definition. Consider a set of account and consumer operation pairs 1, n that have resource demands $x_1, x_2, \ldots, x_n$. The account and consumer operation pair demands may be ordered as such: $x_1 <= x_2 <= \ldots <= x_n$. Let the server have capacity C. Then, we initially give C/n of the resource to the account and consumer operation pair with the smallest demand, $x_1$. This may be more than what account and consumer operation pair 1 wants, so we can continue the process. The process ends when each account and consumer operation pair gets no more than what it asks for, and, if its demand was not satisfied, no less than what any other account and consumer operation pair with a higher index got. Such an allocation maximizes the minimum share of an account and consumer operation pair whose demand is not fully satisfied.

In another embodiment of the present invention, some account and consumer operation pairs may have priority over others such that bigger shares of the resource are provided to account and consumer pairs with priority. In particular, weights $w_1, w_2, \ldots, w_n$ with account and consumer operation pairs 1, 2, . . . , n, which reflect their relative resource share. In embodiments, the weights can be a Cartesian product of the normalized weight values for all the accounts and normalized weight values of the consumer operations. In operation, the weight values for all accounts may be normalized, so that the sum of all the normalized weights adds up to 1. Let $A_i$ denote the normalized weight for account i and similarly the weights on consumer operations may be normalized to have the normalized weights add up to 1. Let $C_j$ denote the normalized weight for consumer j. The weight value for consumer j of account i as $A_i*C_j$ can be computed. The max-min algorithm may be performed on the Cartesian product of accounts and consumers using the computed weights.

The concept of max-min fair share can be extended to include such weights by defining the max-min weighted fair share allocation as follows: resources are allocated in order of increasing demand, normalized by the weight. Additionally, no account and consumer operation pair gets a resource share larger than its demand; and account and consumer operation pairs with unsatisfied demands get resource shares in proportion to their weights.

The resource allocation algorithm applied to a determined demand for an account and consumer operation pair using the max-min fairness algorithm described above. In operation, an account and consumer operation pair may be one of a plurality of account and consumer operation pairs. As such, each account and consumer operation pair may be associated with a selected resource for which a demand is determined. A total demand is determined based on the demand for each of the plurality of account and consumer operations pairs associated with the selected resource. The total demand may be based on a particular computing component including a server, a plurality of servers, or clusters. Other variations of calculating total demand are contemplated with embodiments of the present invention.

A determination can be made whether the total demand for the selected resource is less than or more than the total resource available. When it is determined that the total demand is less than the available amount of the resource, the allocation target is set to the demand attribute value and returned. Basically each account and consumer operation pair receives an allocation target that is at least equal to the demand calculated. The allocation target is communicated to a corresponding server for each of the plurality of account and consumer operation pairs.

When it is determined that the total demand is more than the available amount of the resource, a fair allocation of resources across account and consumer operation pairs is determined. In embodiments, accounts and consumer operations can be associated with weight values that indicate their fair allocation of limited resources. In operation, a weight attribute for each of the plurality of accounts is normalized. A weight attribute for the each of the plurality of consumer operations is normalized. A weight for a consumer operation in an account and consumer operation pair is computed as a Cartesian product of a normalized weight of the account and a normalized weight of the consumer operation. As described above, a max-min fairness algorithm can be performed on the computed Cartesian product to generate allocation target values for the plurality of account and consumer operation pairs.

With continued reference to FIG. 3, the master 302 implements a load balancing logic that uses the usage information collected from the servers. For example, usage of resources can be collected, analyzed, classified as fact data or numerical data. The master can include load balancer 306 to facilitate load balancing the servers based on usage information of resources and allocation targets. A server may include an account having a partition. In embodiments, a partition is associated with a plurality of dimensions for load balancing the partition. The partitions can, in particular, be associated with workloads defined based on allocation targets. It may be desirable to adjust the distribution of the workloads across the servers, in order to optimize resource usage, maximize throughput, minimize response time, avoid overloading of one of the servers, and/or achieve other load balancing objectives. In this regard, partitions may be moved to a server with sufficient available local capacity limit to meet their allocations targets. In embodiments, a multi-dimensional load balancing algorithm may be defined for load balancing. In operation, a dimension (e.g., allocation target) can be defined for a particular resource (e.g., API calls). The allocation target of the partition may indicate the load of the dimension on the server having the partition. The dimension capacity limit on the server corresponds to the local capacity limit of the resource on the server. A multi-dimensional load balancing algorithm can be implemented to naturally balance out the partitions across different servers.

One type of load balancing operation, which can be executed by master 302 comprises a movement of one of the partitions to a different one of the servers of cloud computing system 200 (movement operation). It is noted that movement of a partition does not require physical movement of data at the storage level. Rather, in various implementations, a partition can be moved to another server by reassigning or remapping a partition range assignment of the partition to a new server (e.g. in a partition map). In particular, the partitions of the scalable storage can each correspond to a range of keys in a partitioning index for an object being stored. Exemplary objects include a blob, a table entity, and a queue message. Assigning partitions to partition servers may not move any data stored by the partitions around. Rather, assigning partitions may inform the servers as to what key range(s) of the index the servers are responsible for. For example, master 302 can perform the movement by offloading the partition from one server, assigning the partition to another server, and updating the partition map to reflect that the partition is assigned to the new server.

Another type of load balancing operation, which can be executed by master 202 comprises a splitting of one of the partitions into multiple partitions to be assigned to ones of the servers of cloud computing system 200 (splitting operation). Again, splitting of a partition does not require physical movement of data at the storage level. Rather, in various implementations, a partition can be split by updating the partition map to represent the partition as multiple partitions, which are assigned to the servers.

As another example, a type of load balancing operation, which can be executed by master 202 comprises a merging of ones of the partitions into a shared partition to be assigned to one of the servers of cloud computing system 200 (merging operation). Again, merging of partitions does not require physical movement of data at the storage level. Rather, in various implementations, partitions can be merged by updating the partition map to represent the partitions as a single partition, which is assigned to one of the servers.

Figure 4:
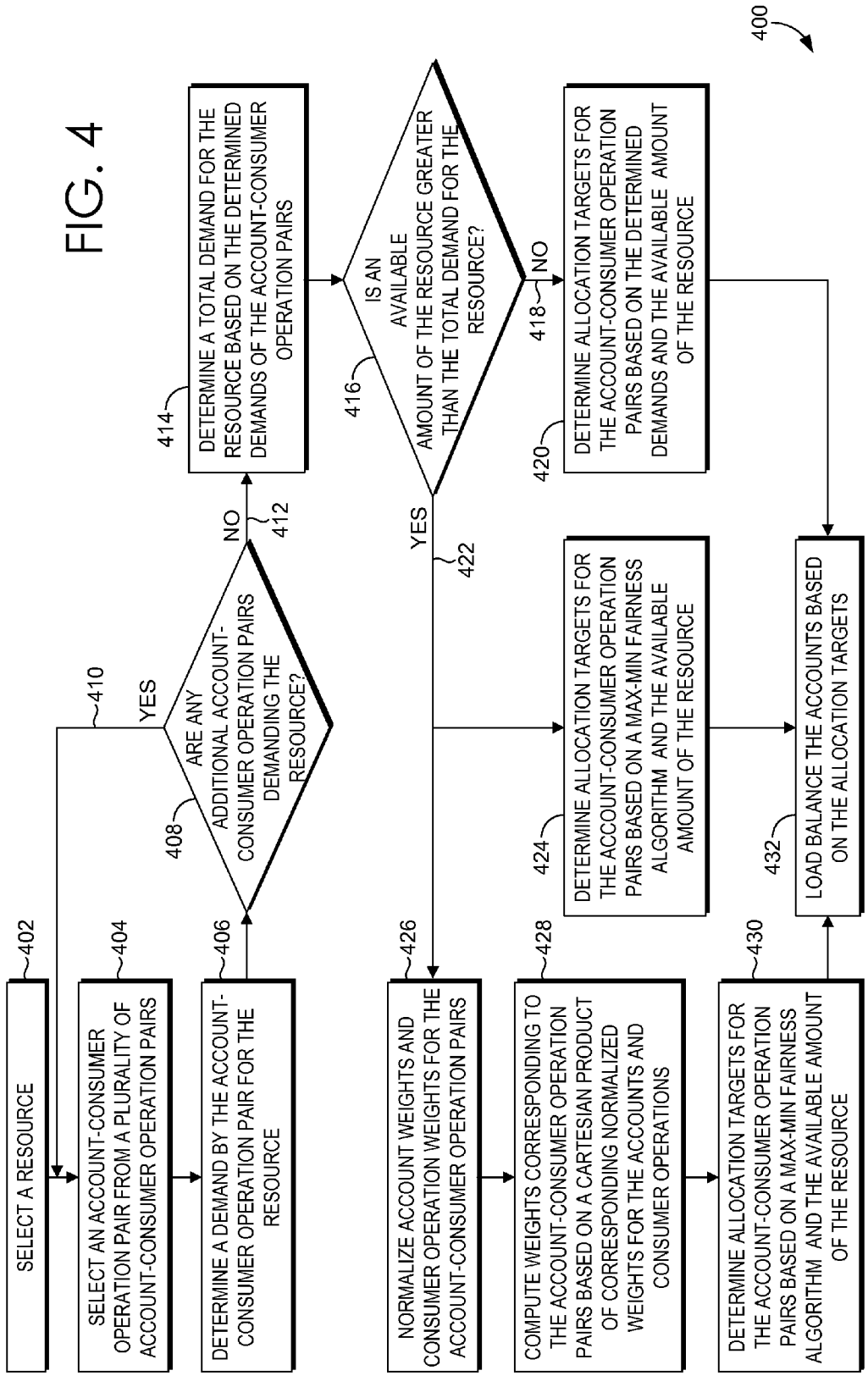
FIG. 4 is a flow diagram showing a method for integrated global resource allocation and load balancing, in accordance with embodiments of the present invention.

Turning now to FIG. 4, a flow diagram is provided that that illustrates a method for integrated global resource allocation and load balancing. At block 402 a resource is selected. A resource may generally refer to physical or abstract components, available within a computing system, that facilitate performing computing operations. By way of example, resources can include CPU cycles, network bandwidth, random access memory, API calls and so on. At block 404 an account and consumer operation pair is selected from a plurality of account and consumer operation pairs. Consumer operations may generally refer to computing operations that utilize a resource of a cloud computing system. An account as used in embodiments of the present invention refers to a customer storage account. The selected account and consumer operation pair is associated with the selected resource. The account and consumer operation pair is further associated with a corresponding server.

At block 406 a demand by the selected account and consumer operation pair for the selected resource is determined. The demand refers to an amount of a resource needed to progress in the performing the consumer operation. One or more of the attributes (e.g., current usage, backlog, tolerance, and allocation target) of a consumer operation can be used to determine the demand of a corresponding consumer operation. For example, the backlog attribute in combination with the usage attribute can be used to estimate the demand for a consumer operation. Any other combinations and variations of attributes to determine a demand are contemplated with embodiments of the present invention. At block 408, a determination is made whether any additional account and consumer operations pairs demand the selected resource. If yes (e.g., 410) the additional account and consumer operation pair is selected and a demand corresponding the account and consumer operation pair is determined. If no (e.g., 408), then at block 414 a total demand for the resource based on the determined demands of each of the account and consumer operation pairs is determined.

At block 416, a determination is made whether an available amount of the resource is greater than the total demand for the resource. If no (e.g., 418), then at block 420 the allocation targets for the account and consumer operation pairs is determined based on the determined demand and the available amount of the resource. In this regard, the determined demands of the account and consumer operation pairs are met. However if yes (e.g., 422) then at block 424 allocation targets for the account and consumer operation pairs are determined based on a max-min fairness algorithm and the available amount of the resource.

And in the alternative if yes (e.g., 422), then at block 426, account weights and consumer operation weights for the account and consumer operations pairs are normalized. In embodiments, normalizing weights that correspond to each of an account and a consumer operation of the plurality of account and consumer operation pairs comprises computing a sum of the weights of the plurality accounts as a predefined account weight sum (e.g., 1) and a sum of the weights of the plurality consumer operations as a predefined consumer operation weight sum (e.g., 1). At block 428, weights corresponding to the plurality of account and consumer operation pairs are computed based on a Cartesian product of corresponding normalized weights of the accounts and the consumer operations. At block 430, the allocation targets for the account and consumer operations are determined based on a max-min fairness algorithm and the available amount of the resource. At block 432, the accounts are load balanced based on the allocation targets. In particular account load balancing may be based on steps described in more detail in FIG. 5 below.

Figure 5:
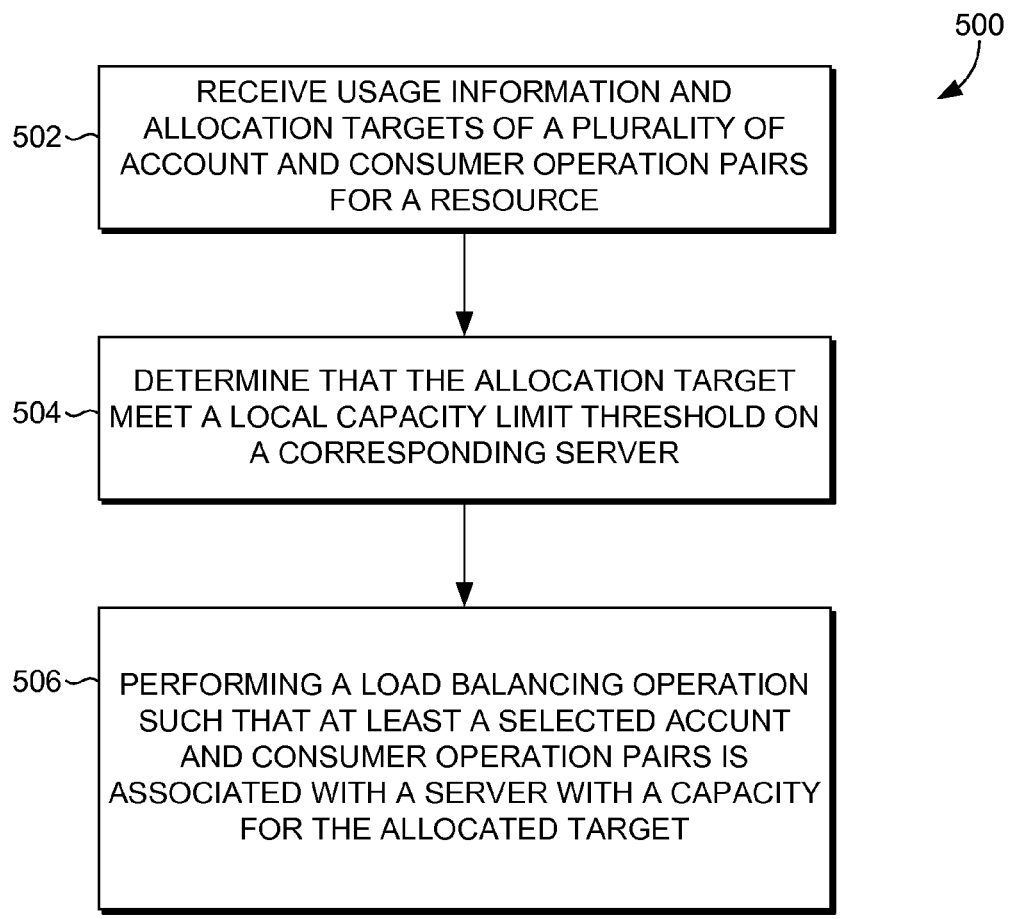
FIG. 5 is a flow diagram showing a method for integrated global resource allocation and load balancing, in accordance with embodiments of the present invention.

Turning now to FIG. 5, a flow diagram is provided that illustrates a method 500 for integrated resource allocation and load balancing in a cloud computing system. At block 502, usage information and allocation targets of a plurality of account and consumer operation pairs for a selected resource are received. The allocation targets indicate an amount of the selected resource of the plurality of account and consumer operation pair on a corresponding cluster. In particular, in multi-dimensional load balancing, discussed below, the allocation target can indicate a load value on a server by a selected dimension. At block 504, it is determined that the allocation targets meet a local capacity limit threshold on the corresponding server. The determination is made based on comparing the allocation targets to the local capacity limit of the corresponding server for the selected resource. At block 506, a load balancing operation is performed such that at least a selected account and consumer operation pair in the plurality of account and consumer operation pairs is associated with a server with a capacity for a corresponding allocation target of the selected account and consumer operation pair.

In embodiments, load balancing is based on a multi-dimensional load balancing algorithm that includes the allocation target as one dimension of a plurality of dimensions used for load balancing. Additional dimensions quantify utilization of one or more resources with respect to the corresponding server. In this regard, load balancing using multiple dimensions can evaluate different dimensions in a multi-dimensional load balancing algorithm. It is contemplated that these dimensions may be prioritized to achieve different load balancing objectives. In operation, servers that have the allocation target and/or one or more of the plurality of dimensions are identified when the servers meet a threshold local capacity limit for the dimension. For example, a determination may be made that the allocation target or one or more dimensions matches a local capacity limit, or be within a predefined percentage of the local capacity limit. Other variations and combinations of thresholds for a local capacity limit of a server are contemplated with embodiments of the present invention.

A server meeting the threshold local capacity limit may be selected and at least one load balancing operation is identified for a partition assigned to the server. A partition may be associated with an account and consumer operation pair. The account and consumer operation pair having at least a portion of the allocation target for the server. The at least one load balancing operation is executed such that a selected account and consumer operation pair is associated with a server with a capacity for the allocated target of the account and consumer operation pair. It is further contemplated that in a multidimensional algorithm, the load balancing operation selected is based identifying a server with the capacity for the allocation target and the one or more additional dimensions.

Embodiments of the present invention have been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects hereinabove set forth together with other advantages obvious and inherent to the structure.

It will be understood that certain features and sub-combinations are of utility and may be employed without reference to other features or sub-combinations. This is contemplated by and is within the scope of the claims.

The invention claimed is:

1. A system for integrated global resource allocation and load balancing performance of computing operations, the system comprising:
 a processor and a memory configured for providing computer program instructions to the processor;
 a global resource allocator to:
  receive usage information of resources, the usage information indicates an amount of resources being consumed by a plurality of account and consumer operation pairs on a plurality of servers, wherein an account is associated with consumer operations that are computing operations that utilize resources, wherein the consumer operations are operations performed for corresponding accounts, the operations selected from the following: live requests, replication, account migration and garbage collection, and wherein accounts are associated with account weight attributes and each of the consumer operations of a corresponding account is associated with a consumer operation weight attribute, wherein a resource is a component that facilitates performing computing operations, wherein resources are dynamically allocated to each of the account and consumer operation pairs to progress each consumer operation for each account; and
 selecting an account and consumer operation pair as a selected account and consumer operation pair;
 selecting a resource, as a selected resource, the selected resource being used by the selected account and consumer operation pair, the selected resource is selected from the following: central processing unit (CPU), network bandwidth, memory, and Application Programming Interface (API) calls;
 for the selected account and consumer operation pair associated with the selected resource, to:
 determine an allocation target of the selected resource for the selected account and consumer operation pair based at least in part on the selected account and consumer operation pair and their computed pair fairness weight based on their corresponding weight attributes, wherein the weight attributes are used to compute a fairness weight for dynamic globally-implemented performance isolation of the plurality of account and consumer operation pairs, wherein computing a fairness weight comprises:
  normalizing account weight attributes based on each of the account weight attributes of the accounts;
  normalizing consumer operation weights based on each of the consumer operation weight attributes of the consumer operations; and
  computing the fairness weight for each of the plurality of account and consumer operation pairs based on a normalized weight of the account weight attributes and a normalized weight of the consumer operation weights;
 wherein the allocation target indicates an amount of the selected resource to be allocated to the selected account and consumer operation pair;
 communicate the allocation target for the selected account and consumer operation pair to a corresponding server, the corresponding server provides the selected resource to the selected account and consumer operation pair based on the allocation target;
 a load balancer to:
 receive the usage information of resources and allocation targets for the plurality of account and consumer operation pairs; and;
 for at least the selected account and consumer operation pair having the allocation target associated with the selected resource, to:
 perform a load balancing operation such that the selected account and consumer operation pair is associated with a server with a capacity for the allocated target of the selected account and consumer operation pair, wherein load balancing is based on the usage information and allocation targets of the plurality of account and consumer operation pairs for the selected resource.

2. The system of claim 1, wherein the plurality of servers is associated with a cluster; and wherein the cluster is associated with a global capacity limit for the selected resource which corresponds to a sum of local capacity limits of the selected resource for the plurality of servers in the cluster.

3. The system of claim 1, wherein determining the allocation target is based on:
 determining a total demand by the plurality of account and consumer operation pairs for the selected resource;
 determining that the total demand is greater than an available amount of the selected resource; and
 computing allocation targets for at least the selected account and consumer operation pairs based at least in part on weighted values associated with the plurality of account and consumer operation pairs.

4. The system of claim 3, wherein computing allocation targets is further based on:
 executing a max-min fairness algorithm using a Cartesian product of the normalized weight of the account weight attributes and the normalized weight of the consumer operation weights to compute the allocation targets for the plurality of account and consumer operation pairs, wherein the max-min algorithm operates to maximize a minimum allocation target for the plurality of account and consumer operation pairs based in part on corresponding fairness weights.

5. The system of claim 1, further comprising:
 a monitoring module to monitor the usage information of resources by the plurality of account and consumer operation pairs, wherein the usage of the resources is tracked independently for each account and consumer operation pair; and
 communicate the usage information of resources to the global resource allocator.

6. The system of claim 1, further comprising:
 a throttle control module to receive allocation targets for at least the account and consumer operation pairs;
 for at least the selected account and consumer operation pair associated with the selected resource:
 compare a current usage of the selected resource by the selected account and consumer operation pair to the allocation target for the selected account and consumer operation pair;
 determine that the current usage of the selected resource exceeds the allocation target for the selected account and consumer operation pair; and
 throttle the current usage of the selected resource to or below the allocation target for the selected account and consumer operation pair.

7. The system of claim 1, wherein each of the plurality of servers is associated with a local capacity limit for the selected resource.

8. The system of claim 7, wherein the throttling control module to further:
 for at least the selected account and consumer operation pair associated with the selected resource:
 compare a current usage for the selected resource, on a corresponding server, to the local capacity limit of the selected account and consumer operation pair;
 determine that the current usage for the selected resource by the selected account and consumer operation pair exceeds the local capacity for the selected resource on the corresponding server; and
 throttle the current usage of the selected resource to or below the local capacity limit.

9. The system of claim 7, wherein performing the load balancing operation such that the selected account and consumer operation pair corresponds with a server with a capacity for the allocated target is based on:
 comparing the local capacity limit for the selected resource, on a corresponding server, to the allocation target for the selected account and consumer operation pair; and
 determining that the local capacity limit for the selected resource exceeds the local capacity on the corresponding server.

10. A computer-implemented method for resource allocation in a cloud computing system performing computing operations, the method comprising:
 selecting a resource, wherein a resource is a component that facilitates performing computing operations;
 determining a total demand by a plurality of account and consumer operation pairs for the selected resource, wherein the plurality of account and consumer operation pairs is associated with a corresponding demand, wherein an account is associated with consumer operations that are computing operations that utilize resources, wherein the consumer operations are operations performed for corresponding accounts, the operations selected from the following: live requests, replication, account migration and garbage collection, and wherein accounts are associated with account weight attributes and each of the consumer operations of a corresponding account is associated with a consumer operation weight attribute, wherein resources are dynamically allocated to each of the account and consumer operation pairs to progress each consumer operation for each account;
 determining that the total demand is greater than an available amount of the selected resource for a cluster, wherein the total demand is based on the corresponding demand of the plurality of account and consumer operation pairs on servers in the cluster; and
 computing allocation targets for the plurality account and consumer operation pairs based in part on the corresponding demand and weight attributes of the plurality of account and consumer operation pairs, wherein the weight attributes are used to compute a fairness weight for dynamic globally-implemented performance isolation of the plurality of account and consumer operation pairs, wherein computing a fairness weight comprises:
 normalizing account weight attributes based on each of the account weight attributes of the accounts;
 normalizing consumer operation weights based on each of the consumer operation weight attributes of the consumer operations; and
 computing the fairness weight for each of the plurality of account and consumer operation pairs based on a normalized weight of the account weight attributes and a normalized weight of the consumer operation weights; and
 wherein an allocation target indicates an amount of the selected resource to be allocated to the selected account and consumer operation pair.

11. The method of claim 10, wherein the corresponding demand of an account and consumer operation pair is based in part on a usage of the resource by a selected consumer operation and a backlog of the selected consumer operation.

12. The method of claim 10, wherein the corresponding demand of an account and consumer operation pair is further based on a tolerance value, where the tolerance value indicates how tolerant the consumer operation is of delays in performing the consumer operation.

13. The method of claim 10, wherein determining that the total demand is greater than the available amount of the resource on the cluster is based at least on comparing a global capacity limit of the cluster for the selected resource to the total demand for the selected resource by the plurality of account and consumer operation pairs.

14. The method of claim 10, wherein an account of an account and consumer operation pair is associated with at least one partition, wherein the partition comprises at least a subset of data associated with the account.

15. The method of claim 10, wherein computing the allocation targets for the plurality of account and consumer operation pairs comprises:
executing a max-min fairness algorithm using a Cartesian product of the normalized weight of the account weight attributes and the normalized weight of the consumer operation weights to compute the allocation targets for the plurality of account and consumer operation pairs, wherein the max-min algorithm operates to maximize a minimum allocation target for the plurality of account and consumer operation pairs based in part on corresponding fairness weights.

16. The method of claim 15, wherein normalizing weights that correspond to each of an account and a consumer operation pair of the plurality of account and consumer operation pairs comprises computing a sum of the weights of the plurality accounts as a predefined account weight sum, and a sum of the weights of the plurality consumer operations as a predefined consumer operation weight sum.

17. A computer-implemented method for integrated resource allocation and load balancing in a cloud computing system performing computing operations, the method comprising:
receiving usage information and allocation targets by a plurality of account and consumer operation pairs for a selected resource, the usage information indicates an amount of the selected resource being consumed by the plurality of account and consumer operation pairs, wherein the allocation targets indicate an amount of the selected resource allocated to the plurality of account and consumer operation pairs on a corresponding cluster, wherein consumer operations are operations performed for corresponding accounts for one or more of the following: live requests, replication, account migration and garbage collection, wherein an account is associated with consumer operations that are computing operations that utilize resources, wherein accounts are associated with account weight attributes and each of the consumer operations of a corresponding account is associated with a consumer operation weight attribute, wherein a resource is a component that facilitates performing computing operations, wherein resources are dynamically allocated to each of the account and consumer operation pairs to progress each consumer operation for each account;
determining that the allocation targets exceed a threshold global capacity limit on a corresponding cluster based on comparing allocation targets to a global capacity limit, wherein allocation targets are based at least in part on corresponding weight attributes of the plurality of account and consumer operation pair and their computed pair fairness weight based on their corresponding weight attributes, wherein the weight attributes are used to compute a fairness weight for dynamic globally-implemented performance isolation of the plurality of account and consumer operation pairs, wherein computing a fairness weight comprises:
normalizing account weight attributes based on each of the account weight attributes of the accounts;
normalizing consumer operation weights based on each of the consumer operation weight attributes of the consumer operations; and
computing the fairness weight for each of the plurality of account and consumer operation pairs based on normalizing account weight attributes and normalizing consumer operation weights; and
performing a load balancing operation such that at least a selected account and consumer operation pair in the plurality of account and consumer operation pairs is associated with a server with a capacity for the allocated target of the selected account and consumer operation pair, wherein load balancing is based on the usage information and allocation targets of the plurality of account and consumer operation pairs for the selected resource.

18. The method of claim 17, wherein receiving usage information is based on:
monitoring the usage information of resources by the plurality of account and consumer operation pairs, wherein the usage of the resources is tracked independently for each account and consumer operation pair; and
communicating the usage information of resources to a load balancer.

19. The method of claim 17, wherein load balancing is based a multi-dimensional load balancing algorithm that includes the allocation target as one dimension of a plurality of dimensions used for load balancing, wherein each dimension quantifies utilization of one or more resources with respect to one or more servers on the cluster.

20. The method of claim 19, wherein multi-dimensional load balancing comprises:
identifying one or more corresponding servers that have at least the allocation target in the plurality of dimensions exceeding the threshold local capacity limit;
selecting at least one server of the plurality of corresponding servers based on at least on the allocation targets of the plurality of account and consumer operation pairs on the at least one server;
identifying at least one load balancing operation associated with partitions assigned to the at least one server; and
executing the at least one load balancing operation such that a selected account and consumer operation pair is associated with a server with a capacity for at least the allocated target.

* * * * *